United States Patent [19]

Tsuru et al.

[11] Patent Number: 5,797,084
[45] Date of Patent: Aug. 18, 1998

[54] RADIO COMMUNICATION EQUIPMENT

[75] Inventors: Teruhisa Tsuru, Kameoka; Harufumi Mandai, Takatsuki; Koji Shiroki; Kenji Asakura, both of Shiga-ken, all of Japan

[73] Assignee: Murata Manufacturing Co. Ltd., Kyoto, Japan

[21] Appl. No.: 664,139

[22] Filed: Jun. 14, 1996

[30] Foreign Application Priority Data

Jun. 15, 1995 [JP] Japan ................... 7-148930

[51] Int. Cl.$^6$ .................. H04B 1/38; H01Q 9/00
[52] U.S. Cl. .................. 455/73; 455/82; 455/90; 455/97; 343/751; 343/893
[58] Field of Search .................. 455/73, 74, 82, 455/89, 90, 97; 343/751, 844, 909, 893, 911 R, 700 MS

[56] References Cited

U.S. PATENT DOCUMENTS

| | | | |
|---|---|---|---|
| 5,351,023 | 9/1994 | Niiranen | 333/202 |
| 5,420,596 | 5/1995 | Burrell et al. | 343/700 |
| 5,453,752 | 9/1995 | Wang et al. | 343/700 |
| 5,483,678 | 1/1996 | Abe | 455/80 |
| 5,554,960 | 9/1996 | Ohnuki et al. | 333/132 |

*Primary Examiner*—Donnie L. Crosland
*Attorney, Agent, or Firm*—Ostrolenk, Faber, Gerb & Soffen, LLP

[57] ABSTRACT

A small radio communication unit which requires no antenna adjustment is provided by using small chip antennas whose gain is not degraded and which have a wide bandwidth. The inventive radio communication unit comprises a first chip antenna contained within the unit and having a first frequency characteristic; a first filter connected to the first antenna and having a pass bandwidth for passing a received signal; a receiving circuit connected to an output end of the first antenna; a receiving PLL circuit for outputting a local oscillation signal; a second chip antenna contained within the unit and having a second frequency characteristic; a second filter connected to the second antenna and having a pass bandwidth for passing a transmitted signal; a transmitting circuit connected to an input end of the second filter and comprising a transmitting carrier oscillation and modulating circuit, a transmission amplifier circuit and an isolator; a control circuit for controlling operations of the receiving circuit and the transmitting circuit; and a modulating signal input terminal to which a modulating signal is applied.

5 Claims, 5 Drawing Sheets

RADIO COMMUNICATION EQUIPMENT

BACKGROUND OF THE INVENTION

1. Field of the Invention

The present invention relates to radio communication equipment and more particularly to a radio communication unit for use in mobile radio communications, such as an automobile telephone or a portable telephone, for conducting bi-directional radio communications between a radio base station and the mobile unit.

2. Description of Related Art

A prior art mobile radio unit will be explained below with reference to FIG. 10. In the figure, the radio communication unit 60 comprises a first antenna 61 contained within the unit 60 and being a microstrip line antenna, an inverted-F type antenna or the like having a certain frequency characteristic, and a first filter 12 connected to the first antenna 61 and having a pass band for passing a received signal. A receiving circuit 13 receives the received signal which has passed through the first filter 12, and detects and outputs a predetermined intermediate frequency signal based on a local oscillation signal from a receiving PLL circuit 14. A control circuit 15 supplies data representing a frequency dividing ratio to a programmable frequency divider comprised in the receiving PLL circuit 14 and to a programmable frequency divider comprised in a transmitting carrier oscillation and modulating circuit 17. A modulating signal input terminal 16 receives a modulating signal based on a speech signal or the like received by a microphone (not shown).

The above-mentioned transmitting carrier oscillation and modulating circuit 17, comprising a PLL circuit, outputs a transmitted carrier signal based on the data which determine the frequency dividing ratio from the control circuit 15, and modulates the transmitted carrier signal based on the modulating signal applied from the modulating signal input terminal 16. A transmission amplifier circuit 18 amplifies the output of the transmitting carrier oscillation and modulating circuit 17 to a predetermined transmission level and its output passes through an isolator 19. The transmitting carrier oscillation and modulating circuit 17, the transmission amplifier circuit 18 and the isolator 19 will be referred to collectively as a transmitting circuit 20. The radio unit 60 further includes a second filter 21 connected at the output side of the transmitting circuit 20 and having a pass band for passing a transmitted signal and a second antenna 62 connected at the output side of the second filter 21 and being a microstrip line antenna, an inverted-F type antenna or the like having a certain frequency characteristic.

In the prior art mobile radio unit constructed as described above, problems may occur because of the use of a microstripline type antenna or an inverted-F type antenna as the first and second antennas 61 and 62. That is, a line length, in case of the microstrip line antenna, or a sum of vertical and horizontal lengths, in case of the inverted-F type antenna, had to be λ/4 (λ: a wavelength corresponding to a frequency of use). Accordingly, because the size of the antenna is large, the prior art radio communication unit has had a problem in that it is not suited for use as a mobile unit, e.g. a portable telephone, which is required to be small.

If the size of microstrip line antenna or the inverted-F-type antenna is reduced, its bandwidth is narrowed and the tuning of the resonant frequency of the antenna becomes more complicated, because its bandwidth does not meet the requirements for the receiving/transmission bandwidth of a mobile unit, or even if it does meet those bandwidth requirements, it might have only the narrowest possible bandwidth permissible. Reducing the size of the antenna also causes another problem, in that the gain of the antenna is degraded.

SUMMARY OF THE INVENTION

Accordingly, it is an object of the present invention to eliminate the aforementioned problems by providing a small antenna for radio communication equipment requiring no adjusting step. The antenna is advantageously a chip antenna, which is small, causes no degradation of gain and has a wide bandwidth.

In order to solve the aforementioned problems, a radio unit according to the invention may comprise a first antenna contained within the unit and having a first frequency characteristic; a first filter connected to the first antenna and having a pass bandwidth for passing a received signal; a receiving circuit connected to an output end of the first filter; a second antenna contained within the equipment and having a second frequency characteristic; a second filter connected to the second antenna and having a pass bandwidth for passing a transmitted signal; a transmitting circuit connected to an input end of the second filter; and a control circuit for controlling operations of the receiving circuit and the transmitting circuit. The first antenna and second antenna are realized by chip antennas each comprising a dielectric substrate, a spiral wound conductor disposed on the surface or within the dielectric substrate, and at least one feeding terminal, provided on the dielectric substrate, for conducting a signal to or from the spiral conductor.

According to the invention, isolation between the first antenna (receiving antenna) and the second antenna (transmitting antenna) can be maintained without using an antenna multiplexer by using the small chip antennas for the first and second antennas and by disposing them separated within the radio unit with a spacing therebetween.

The size of the mobile station may be reduced further by supplying a received signal to the receiving circuit from the first antenna via the first filter and by supplying a transmitted signal to the second antenna from the transmitting circuit via the second filter.

The above and other related objects and features of the invention will be apparent from a reading of the following description of the disclosure found in the accompanying drawings.

DESCRIPTION OF PREFERRED EMBODIMENTS

Figure 1:
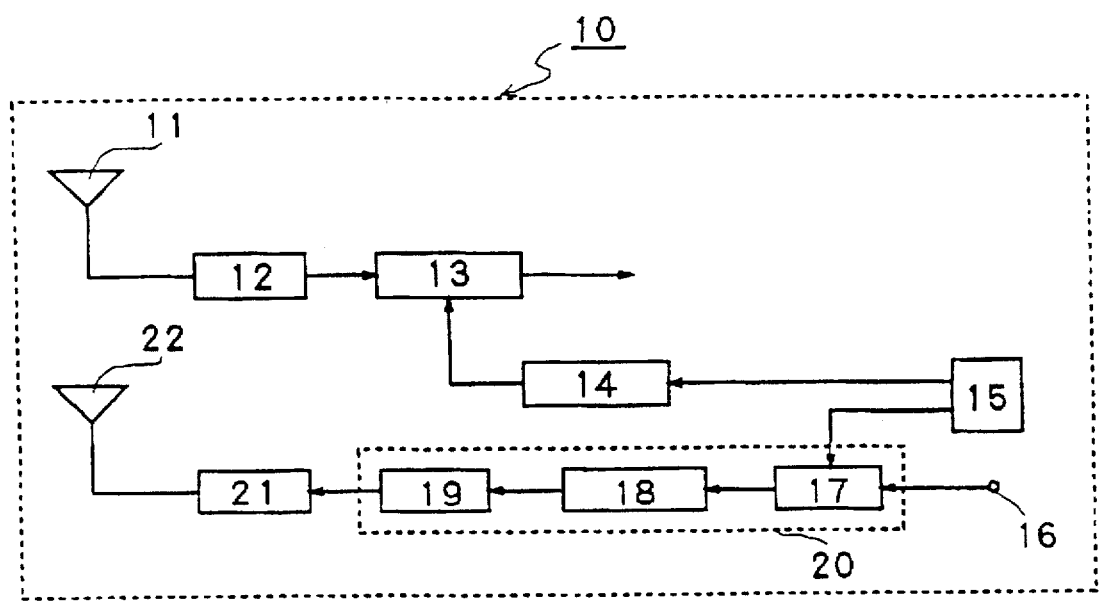
FIG. 1 is a schematic circuit block diagram showing one preferred embodiment of an inventive mobile radio communication unit.

Preferred embodiments of the present invention will be explained below with reference to the drawings. It is noted that the same reference numerals refer to the same or corresponding parts in the prior art example throughout the description of the embodiments and unnecessary detailed explanations thereof will be omitted.

Figure 10:
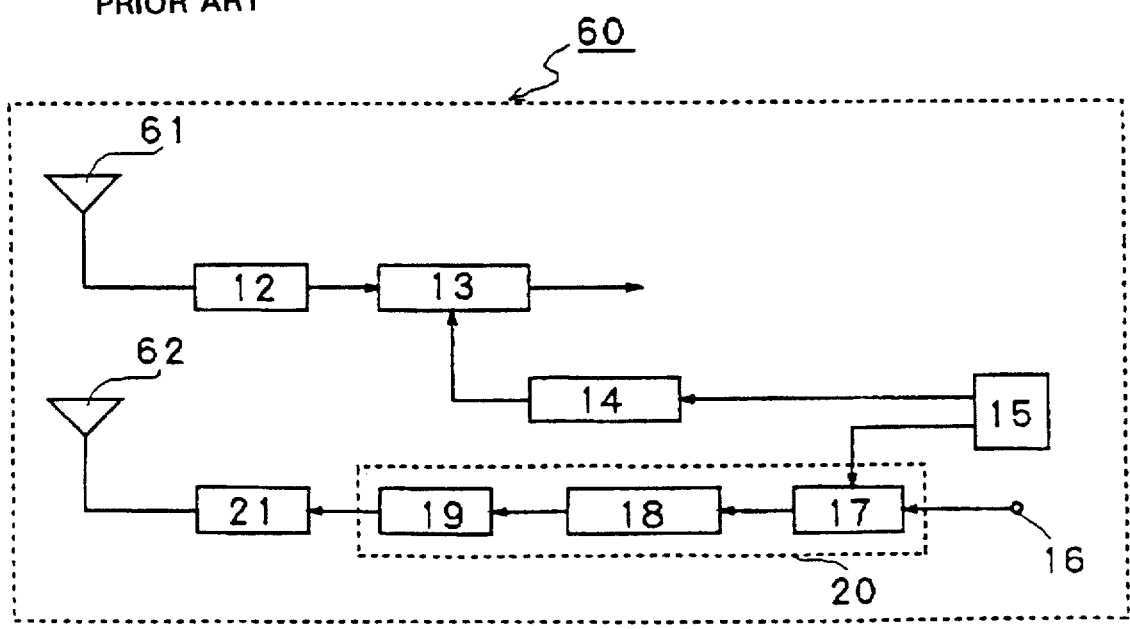
FIG. 10 is a schematic circuit block diagram showing a prior art radio communication equipment.

FIG. 1 shows one embodiment of an inventive radio communication unit. The radio communication unit 10 for a single band system has the same general structure as the prior art example of FIG. 10. More specifically, it comprises a first antenna 11 realized by a chip antenna contained within the unit 10 and having a first desired frequency characteristic, a first filter 12, a receiving circuit 13, a receiving PLL circuit 14, a control circuit 15, a modulating signal input terminal 16, a transmitting carrier oscillation and modulating circuit 17, a transmission amplifier circuit 18, an isolator 19, a transmitting circuit 20, a second filter 21 and a second antenna 22 realized by a chip antenna contained within the unit 10 and having a second desired frequency characteristic.

Figure 2:
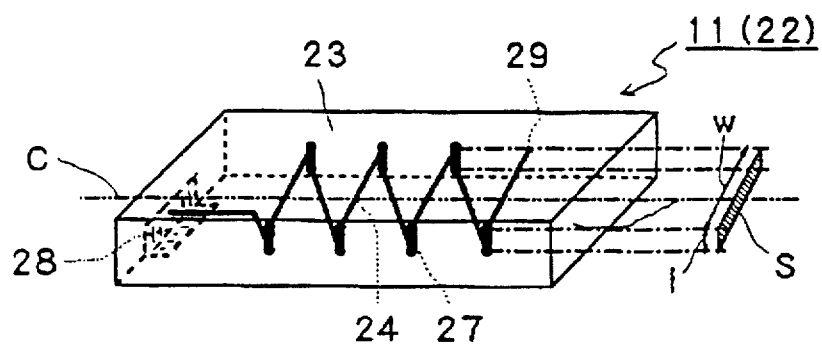
FIG. 2 is a perspective view of a chip antenna used in the radio communication equipment in FIG. 1.
Figure 3:
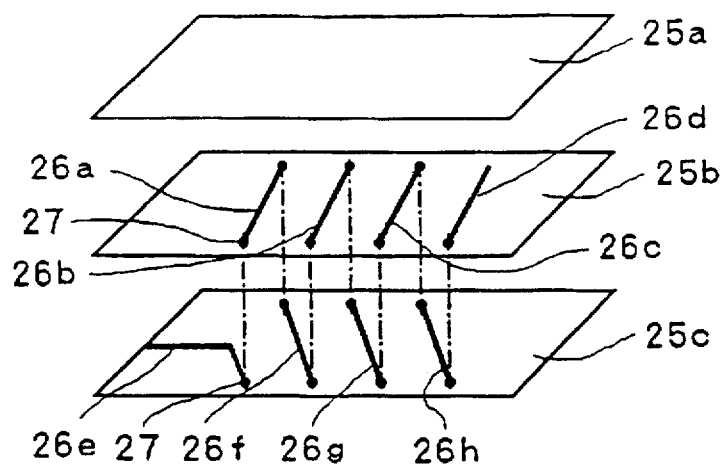
FIG. 3 is an exploded perspective view of the chip antenna used in the radio communication equipment in FIG. 1.

FIGS. 2 and 3 are a perspective view and an exploded perspective view of the first and second antennas 11 and 22 used in the inventive radio communication unit 10. The first and second antennas 11 and 22 each comprise a wound conductor 24 which is wound in a spiral and whose axis of winding C is parallel with a longitudinal direction of a rectangular parallelepiped-shaped dielectric substrate 23.

The dielectric substrate 23 is formed by laminating rectangular dielectric sheets 25a, 25b and 25c made out of a ceramics mixture mainly composed of barium oxide, aluminum oxide and silica, a resin such as a Teflon (trademark) resin, or a mixture of the ceramics and the resin. Linear conductive patterns 26a through 26h made out of copper or copper alloy are provided on the surface of the dielectric sheets 25b and 25c by printing, evaporation, pasting or plating, and via holes 27 are created in the thickness direction of the dielectric sheets 25b and 25c. The spiral wound conductor 24 is formed by laminating the dielectric sheets 25a through 25c and by connecting the conductive patterns 26a through 26h via the via holes 27.

The conductor 24 is wound so as to define a section S which is perpendicular to the axis of winding C of the conductor 24. In this example the section S is a rectangle of length 1 and width w. One end of the conductor 24 (one end of the conductive pattern 26e) is led out to the surface of the dielectric substrate 23 and connected to a feeding terminal 28 and the other end (one end of the conductive pattern 26d) forms a free end 29 within the dielectric substrate 23.

It is noted that the section S of the wound conductor 24 is not limited to being rectangular. It may be circular, oval or semi-circular in shape and furthermore may have straight portions at least at parts thereof.

Further, although the dielectric substrate is formed by laminating a plurality of dielectric sheets in the example explained above, the dielectric substrate may also be formed by using a single block-like dielectric for example.

Although the wound conductor is formed within the dielectric substrate in the example explained above, it is also possible to form the wound conductor by winding conductive patterns on the surface of the dielectric substrate. Or, it is possible to form the wound conductor by creating a spiral groove on the surface of the dielectric substrate and winding a wire member such as a plated wire or enameled wire along the groove.

Although the dielectric substrate is a rectangular parallelepiped in the example explained above, the dielectric substrate may have another shape such as a spherical, cubic, conical or pyramid shape.

Further, although the axis of winding of the wound conductor is parallel with the longitudinal direction of the dielectric substrate in the example shown above, the wound conductor may also be disposed so that the axis of winding is perpendicular to the longitudinal direction.

The operation of the radio communication unit 10 shown in FIG. 1 will be explained below.

After being received by the first antenna 11, a radio wave transmitted from a radio base station is filtered with respect to a receiving frequency band by the first filter 12 and is then input to the receiving circuit 13. The receiving circuit 13 frequency-converts the received signal to a predetermined intermediate frequency signal based on a local oscillation signal which is supplied by the receiving PLL circuit 14, and which corresponds to a data channel or a voice channel. Then the receiving circuit 13 detects the intermediate frequency signal and demodulates the transmitted signal. If the demodulated output is data in a data channel, it is then supplied to the control circuit 15. If it is a speech signal in a voice channel, it is then supplied to a sound processing circuit (not shown).

When a radio wave is to be transmitted from the mobile unit on the other hand, the transmitting carrier oscillation and modulating circuit 17 generates a transmitting carrier of the control channel or the speaking channel based on frequency dividing ratio data from the control circuit 15. The transmitting carrier signal is modulated by supplying a modulating signal (e.g., a processed speech signal from the microphone or a digital control data signal or the like) applied from the modulating signal input terminal 16 to the transmitting carrier oscillation and modulating circuit 17. The carrier signal is then amplified to a predetermined transmitting level by the transmission amplifier circuit 18. The amplified carrier signal is then supplied via the isolator 19 and the second filter 21 to the second antenna 22, and transmitted.

Figure 4:
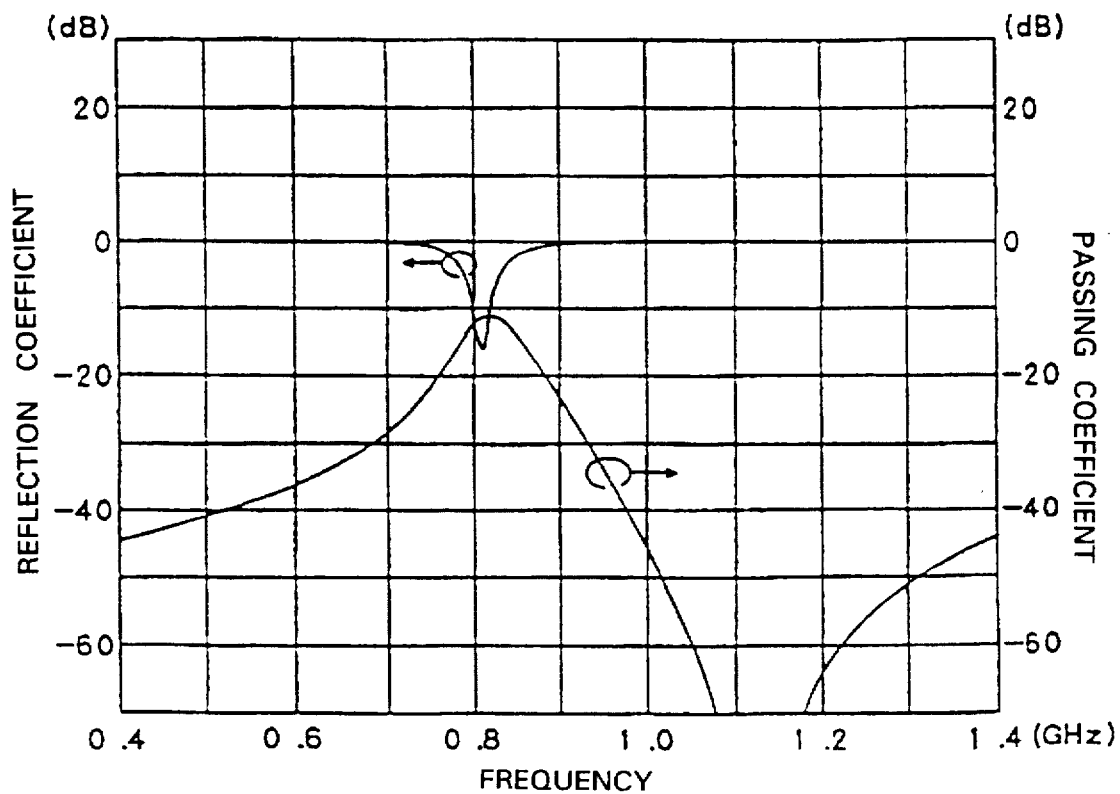
FIG. 4 is a graph showing a result of measurement of an antenna characteristic of the chip antenna in the radio communication equipment in FIG. 1.

FIG. 4 shows a result of measurement of antenna characteristics of the first and second antennas 11 and 22 in the radio communication equipment 10. These antenna characteristics were taken with the first antenna 11 and the second antenna 22 being 5 mm in width×8 mm in depth×2.5 mm in height. The antennas were mounted separated by a distance of 30 mm to prevent the first antenna 11 from receiving a signal output from the second antenna 22, i.e., for the purpose of isolation. Here, the center frequency of the receiving circuit 13 and the first antenna 11 is 820 MHz and the center frequency of the transmitting circuit 20 and the second antenna 22 is 878 MHz.

It can be seen from FIG. 4 that when an 878 MHz radio wave is transmitted from the transmitting circuit 20, the receiving circuit 13 receives it with attenuation of −19.22 dB. That means that the isolation is 19.22 dB and that the first and second antennas 11 and 22 have a filtering characteristic. Accordingly, it is proven that this arrangement can fully prevent the first antenna 11 from receiving the signal output from the second antenna 22.

Figure 5:
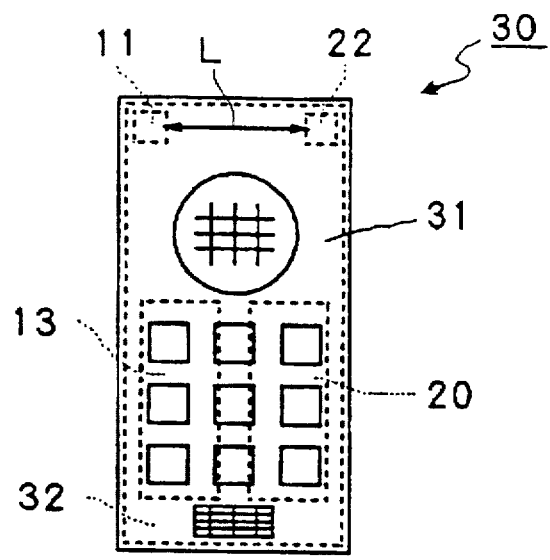
FIG. 5 is a front view of a mobile radio unit in which the radio communication circuit in FIG. 1 is mounted.
Figure 6:
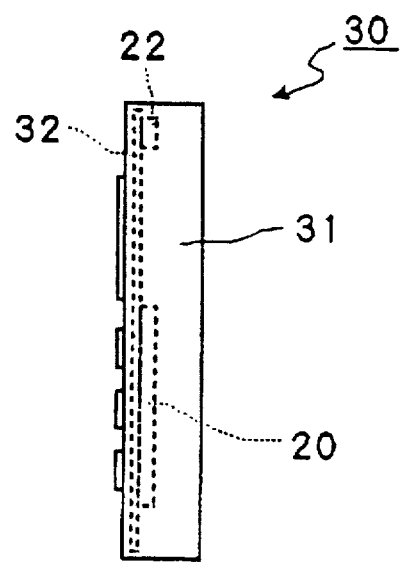
FIG. 6 is a side view of the mobile radio unit in FIG. 5.

FIGS. 5 and 6 show front and side views of a mobile unit for a single band system in which the inventive radio communication circuit is mounted. The mobile unit e.g., a portable telephone 30, includes the radio communication circuit 10 shown in FIG. 1 and has a printed board on which the receiving circuit 13 and the transmitting circuit 20 are mounted slightly below the center of a case 31. The first antenna 11 and the second antenna 22 are mounted above and are separated by a distance (e.g., 30 mm) for isolation. The isolation of the first antenna 11 and the second antenna 22 depends on the distance L between them. That is, the wider the distance L, the greater the isolation becomes.

It is noted that although the radio communication circuit is for a single band system in the above-mentioned embodiment, it may be applied also to a multi-band system by preparing a plurality of first antennas, second antennas, receiving circuits and transmission circuits corresponding to the respective frequency characteristics of each system.

Figure 7:
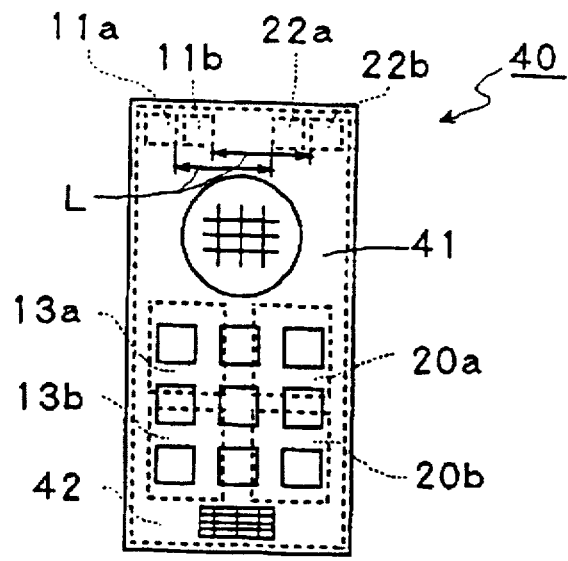
FIG. 7 is a front view of another mobile unit in which the radio communication circuit in FIG. 1 is mounted.
Figure 8:
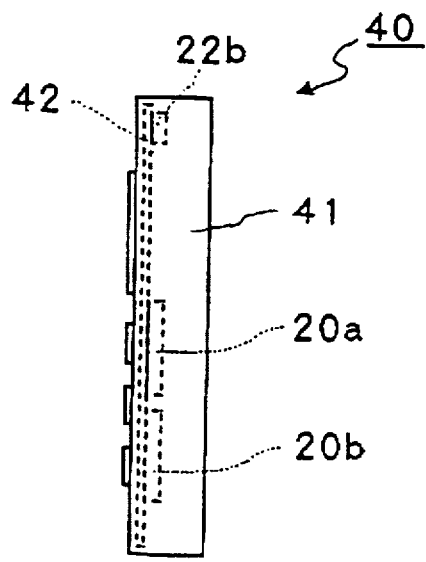
FIG. 8 is a side view of the mobile radio unit in FIG. 7.

FIGS. 7 and 8 are front and side views of a mobile unit for a multi-band system in which the inventive radio communication circuit is mounted. The mobile unit, e.g. a portable telephone 40, uses a plurality of the radio communication circuits 10 shown in FIG. 1 and has a case 41 containing a printed board 42 which supports a first antenna 11a, a second antenna 22a, a receiving circuit 13a and a transmitting circuit 20a for the 800 MHz band, and a first antenna 11b, a second antenna 22b, a receiving circuit 13b and a transmitting circuit 20b for the 1.5 GHz band.

As in the portable telephone 30 shown in FIG. 5, the first and second antennas 11a and 22a for the 800 MHz band and the first and second antennas 11b and 22b for the 1.5 GHz band are mounted separately on the printed board 42 with a distance L for isolation, respectively.

On the other hand, the first antenna 11a for the 800 MHz band and the first antenna 11b for the 1.5 GHz band, and the second antenna 22a for the 800 MHz band and the second antenna 22b for the 1.5 GHz band are hardly affected by each other because their center frequencies are considerably different. Accordingly, they may be placed close to each other.

Figure 9:
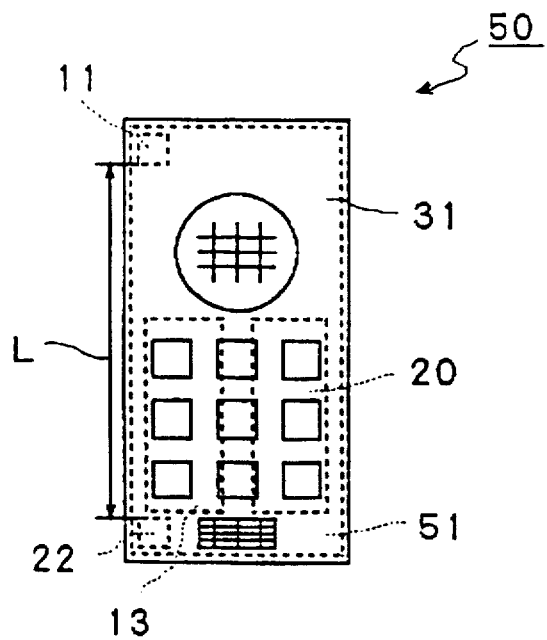
FIG. 9 is a front view of a still other mobile radio unit in which the radio communication equipment in FIG. 1 is mounted.

While the first and second antennas are provided at the upper part of the case in the above portable telephones 30 and 40, the chip antennas may be provided at any other part of the case as well, so long as they are separated by the distance L for isolation. For example, the first and second antennas 11 and 22 may be disposed respectively at the upper and lower parts of a portable telephone 51 as shown in FIG. 9 to widen the distance L.

It is noted that while a mobile unit such as a portable telephone has been explained above, the invention may also be applied to an automobile telephone or a radio unit for a radio LAN (Local Area Network).

As described above, according to the present embodiment, because the first antennas (receiving antennas) and the second antennas (transmitting antennas) are small chip antennas, which are 5 mm in width×8 mm in depth×2.5 mm in height, and are separated by the distance L for isolation, a small radio communication unit which requires no antenna multiplexer may be constructed. Because the inventive radio communication equipment uses the unique small chip antennas as the first and second antennas, it becomes possible to reduce the size of the antenna section, to eliminate the antenna multiplexer and to thereby provide small radio communication equipment.

Further, because the first and second antennas have a filtering characteristic, it becomes possible to reduce the number of resonators required to filter the received and transmitted signals.

It also becomes possible to reduce the output of the transmission amplifier circuit, because filter insertion losses are reduced, and to thereby reduce the size of the radio communication equipment.

Further, because the unique small chip antennas are used for the first and second antennas, the gain is not degraded.

Still further, the use of the chip antennas having a wide bandwidth allows an antenna adjusting step to be eliminated.

While preferred embodiments have been described, variations thereto will occur to those skilled in the art within the scope of the disclosed inventive concepts. Therefore, the invention is not limited by the disclosed embodiments.

What is claimed is:

1. A radio communication unit, comprising:

a first antenna contained within said unit and having a first frequency characteristic;

a first filter connected to said first antenna and having a pass bandwidth for passing a received signal; a receiving circuit connected to an output end of said first filter;

a second antenna contained within said unit and having a second frequency characteristic;

a second filter connected to said second antenna and having a pass bandwidth for passing a transmitted signal;

a transmitting circuit connected to an input end of said second filter; and a control circuit for controlling operations of said receiving circuit and said transmitting circuit;

at least one of said first and second antennas being a chip antenna comprising a dielectric substrate having a plurality of dielectric layers stacked on top of each other, the stacked layers establishing a direction normal to the stacked layers, a spiral wound conductor disposed inside the dielectric substrate having a spiral axis extending perpendicular to the direction normal to the stacked layers, and a feeding terminal being connected to the spiral wound conductor.

2. A radio communication unit according to claim 1, wherein each said feeding terminal is conductively connected to the corresponding spiral wound conductor.

3. A radio communication unit according to claim 1, wherein each said spiral wound conductor is disposed within the corresponding dielectric substrate.

4. A radio communication unit according to claim 1, wherein said first and second antennas are both contained within said radio communication unit and are respectively for receiving and transmitting in a same frequency band, but are substantially isolated from each other by being separated from each other by a predetermined distance within said unit.

5. A radio communication unit, comprising:

a first radio circuit for transmitting and receiving in a first frequency band, and a second radio circuit for transmitting and receiving in a second frequency band;

said first radio circuit comprising:

a first antenna contained within said unit and having a first frequency characteristic of the first frequency band;

a first filter connected to said first antenna and having a pass bandwidth for passing a received signal of the first frequency band;

a first receiving circuit connected to an output end of said first filter;

a second antenna contained within said unit and having a second frequency characteristic of the first frequency band;

a second filter connected to said second antenna and having a pass bandwidth for passing a transmitted signal of the first frequency band;

a first transmitting circuit connected to an input end of said second filter; and a first control circuit for controlling operations of said first receiving circuit and said first transmitting circuit;

at least one of said first and second antennas being a chip antenna comprising a dielectric substrate having a plurality of dielectric layers stacked on top of each other, the stacked layers establishing a direction normal to the stacked layers, a first spiral wound conductor disposed inside the dielectric substrate having a spiral axis extending perpendicular to the direction normal to the stacked layers, and a feeding terminal being connected to the first spiral wound conductor;

said second radio circuit comprising:

a second first antenna contained within said unit and having a second frequency characteristic of the second frequency band;

a second first filter connected to said second first antenna and having a pass bandwidth for passing a received signal of the second frequency band;

a second receiving circuit connected to an output end of said first filter;

a second second antenna contained within said unit and having a second frequency characteristic of the second frequency band;

a second second filter connected to said second second antenna and having a pass bandwidth for passing a transmitted signal of the second frequency band;

a second transmitting circuit connected to an input end of said second second filter; and a second control circuit for controlling operations of said second receiving circuit and said second transmitting circuit;

at least one of said second first and second antennas being a chip antenna comprising a dielectric substrate having a plurality of dielectric layers stacked on top of each other, the stacked layers establishing a direction normal to the stacked layers, a second spiral wound conductor disposed inside the dielectric substrate having a spiral axis extending perpendicular to the direction normal to the stacked layers, and a feeding terminal being connected to the second spiral wound conductor;

wherein said first and second antennas of said first radio circuit are both contained within said radio communication unit and are respectively for receiving and transmitting in the first frequency band, and are substantially isolated from each other by being separated from each other by at least a predetermined distance within said unit;

wherein said first and second antennas of said second radio circuit are both contained within said radio communication unit and are respectively for receiving and transmitting in the second frequency band, and are substantially isolated from each other by being separated from each other by at least said predetermined distance within said unit;

wherein said respective first antennas of said first and second radio circuits are separated from each other by less than said predetermined distance; and wherein said respective second antennas of said first and second radio circuits are separated from each other by less than said predetermined distance.

* * * * *